US011332859B2

(12) United States Patent
Qiu et al.

(10) Patent No.: US 11,332,859 B2
(45) Date of Patent: May 17, 2022

(54) IMPACT RESISTANT, SHRINKABLE BRAIDED TUBULAR SLEEVE AND METHOD OF CONSTRUCTION THEREOF

(71) Applicant: Federal-Mogul Powertrain, LLC, Southfield, MI (US)

(72) Inventors: Xiaodan Qiu, Exton, PA (US); Leigh Krauser, Coatesville, PA (US); Mike Piotrowski, Plymouth Meeting, PA (US); Tianqi Gao, Exton, PA (US); Emma Adamski, Pottstown, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 879 days.

(21) Appl. No.: 15/684,799

(22) Filed: Aug. 23, 2017

(65) Prior Publication Data

US 2018/0057982 A1    Mar. 1, 2018

Related U.S. Application Data

(60) Provisional application No. 62/379,015, filed on Aug. 24, 2016.

(51) Int. Cl.
| | | |
|---|---|---|
| *D04C 1/06* | (2006.01) | |
| *H02G 3/04* | (2006.01) | |
| *D02G 3/38* | (2006.01) | |
| *D04C 1/02* | (2006.01) | |

(52) U.S. Cl.
CPC ............... *D04C 1/06* (2013.01); *D02G 3/38* (2013.01); *D04C 1/02* (2013.01); *H02G 3/0481* (2013.01); *D10B 2401/041* (2013.01); *D10B 2403/02* (2013.01); *D10B 2505/12* (2013.01)

(58) Field of Classification Search
USPC .............................................................. 87/9
See application file for complete search history.

(56) References Cited

U.S. PATENT DOCUMENTS

| | | |
|---|---|---|
| 4,741,087 A | 5/1988 | Plummer, Jr. |
| 4,754,685 A | 7/1988 | Kite et al. |
| 4,777,859 A | 10/1988 | Plummer, Jr. |
| (Continued) | | |

FOREIGN PATENT DOCUMENTS

| | | | |
|---|---|---|---|
| DE | 10212922 A1 * | 10/2003 | ............... D04C 1/02 |
| EP | 1394311 A1 | 3/2004 | |
| | (Continued) | | |

OTHER PUBLICATIONS

International Search Report, dated Dec. 5, 2017 (PCT/US2017/048299).

*Primary Examiner* — Khoa D Huynh
*Assistant Examiner* — Uyen T Nguyen
(74) *Attorney, Agent, or Firm* — Robert L. Stearns; Dickinson Wright, PLLC

(57) ABSTRACT

A textile sleeve for routing and protecting elongate members and method of construction thereof is provided. The sleeve includes an elongate, braided wall having a circumferentially continuous, tubular outer periphery extending along a central axis between opposite open ends. The wall includes shrinkable yarns and non-shrinkable yarns. The shrinkable yarn provides the wall with an ability to be radially contracted from a first, diametrically enlarged assembly state to a second, diametrically shrunken state.

14 Claims, 4 Drawing Sheets

(56) References Cited

U.S. PATENT DOCUMENTS

| | | | | |
|---|---|---|---|---|
| 6,112,634 A | * | 9/2000 | Head | B60R 21/235 |
| | | | | 280/728.1 |
| 6,148,865 A | * | 11/2000 | Head | B29C 70/222 |
| | | | | 138/123 |
| 7,647,946 B2 | | 1/2010 | Mirmand et al. | |
| 10,167,582 B1 | * | 1/2019 | Pilgeram | D04C 3/48 |
| 2010/0108171 A1 | | 5/2010 | Relats Manent et al. | |
| 2013/0228248 A1 | | 9/2013 | Malloy et al. | |
| 2014/0220276 A1 | * | 8/2014 | Gao | F16L 57/06 |
| | | | | 428/36.1 |
| 2016/0010247 A1 | | 1/2016 | De Backer | |
| 2016/0047072 A1 | | 2/2016 | Tsai | |
| 2016/0122915 A1 | | 5/2016 | Fathallah et al. | |

FOREIGN PATENT DOCUMENTS

| | | | |
|---|---|---|---|
| JP | S62276063 A | 11/1987 | |
| JP | H05505218 A | 8/1993 | |
| WO | 9206235 A | 4/1992 | |
| WO | 2011161576 A | 12/2011 | |
| WO | 2013131041 A2 | 9/2013 | |

\* cited by examiner

IMPACT RESISTANT, SHRINKABLE BRAIDED TUBULAR SLEEVE AND METHOD OF CONSTRUCTION THEREOF

CROSS-REFERENCE TO RELATED APPLICATION

This application claims the benefit of U.S. Provisional Application Ser. No. 62/379,015, filed Aug. 24, 2016, which is incorporated herein by reference in its entirety.

BACKGROUND OF THE INVENTION

1. Technical Field

This invention relates generally to textile sleeves for protecting elongate members, and more particularly to shrinkable braided tubular sleeves.

2. Related Art

It is known to contain elongate members, such as wires, wire harnesses, cables and conduits of various types in braided sleeves to provide protection to the elongate members against impact and abrasion, fluid and thermal affects. In applications where high impact resistance is needed to prevent damage to the sleeve and the contents therein, both wrappable and circumferentially continuous, tubular sleeves are known. Though each can be made to provide suitable protection against impact forces and abrasion, each comes with drawbacks. Wrappable sleeves requires secondary features to secure them about the elongate member being protected, such as clamps, straps, tapes and the like, and thus, additional labor and time is required during assembly, thereby increasing the cost of assembly. Further, having to keep the secondary features in stock is costly. Further yet, the secondary feature presents a possibility of coming undone during use, thereby potentially risking direct exposure of the elongate member to environmental effects. In addition, wrappable sleeves typically have a non-uniform thickness with opposite edges being overlapped, and thus, the outer envelop of the sleeve has an increased thickness region that can prevent it from being used in tight areas, or otherwise make assembly difficult. Another drawback to wrappable sleeves is the need to keep different sizes in stock for different diameter applications, and this further increases inventory and cost.

With regard to circumferentially continuous, tubular sleeves, as with wrappable sleeves, a need to keep different sizes in stock for different diameter applications exists. Further, tubular sleeves are commonly fixed in diameter, and as such, it can be difficult or impossible to use this type of sleeve in applications where the elongate member has regions of increased size relative to the dimeter of the sleeve, such that the sleeve will not fit over the increased size region, such as a connector, for example. Further, fixed diameter tubular sleeves typically require secondary fasteners to secure them in position, and thus, they suffer from the same drawbacks discussed above. In addition, as discussed above, in order to provide the desired impact resistance, it is generally necessary to form the wall being relatively thick, and thus, taking away from the ability to use the sleeve in relatively tight spaces.

Accordingly, what is needed is a sleeve that provides enhanced protection to an elongate member contained therein, particularly against impact, abrasion and contamination, remains fixed in place while in use, is useful over a wide range of elongate member diameters, is economical in manufacture and assembly, and exhibits a long and useful life.

SUMMARY OF THE INVENTION

One aspect of the invention provides a textile sleeve for routing and protecting elongate members. The sleeve includes an elongate, braided wall having a circumferentially continuous, tubular outer periphery extending along a central axis between opposite open ends. The wall includes shrinkable yarns and non-shrinkable yarns. The shrinkable yarn provides the wall with an ability to be radially contracted from a first, diametrically enlarged assembly state to a second, diametrically shrunken state.

In accordance with another aspect of the invention, the ratio between the diameter of the first, diametrically enlarged assembly state and diameter of the second, diametrically shrunken state can range between about 1.5:1 to 5:1 or greater.

In accordance with another aspect of the invention, the shrinkable yarns and non-shrinkable yarns can be braided together as discrete bundles of yarns in side-by-side, abutting relation with one another from the same bobbin.

In accordance with another aspect of the invention, the shrinkable yarns and non-shrinkable yarns can be braided separately from one another from different bobbins.

In accordance with another aspect of the invention, the shrinkable yarns and non-shrinkable yarns can be braided separately from one another to extend along different paths from one another.

In accordance with another aspect of the invention, the shrinkable yarns can be provided as monofilaments.

In accordance with another aspect of the invention, the shrinkable yarns can be provided as multifilaments.

In accordance with another aspect of the invention, the shrinkable yarns can be provided as multifilaments and/or monofilaments.

In accordance with another aspect of the invention, the non-shrinkable yarns can be provided as monofilaments.

In accordance with another aspect of the invention, the non-shrinkable yarns can be provided as multifilaments.

In accordance with another aspect of the invention, the non-shrinkable yarns can be provided as multifilaments and/or monofilaments.

In accordance with another aspect of the invention, the non-shrinkable yarns can be air texturized multifilaments.

In accordance with another aspect of the invention, the non-shrinkable yarns can be provided as at least one or more of PET, nylon, PP, PE, PPS, PEEK, and Nomex.

In accordance with another aspect of the invention, the wall can have a first density when in the first, diametrically enlarged assembly state and a second density when in the second, diametrically constricted state, with the second density being about 1.5 times greater or more than the first density.

In accordance with yet another aspect of the invention, a method of constructing a textile sleeve for routing and protecting elongate members is provided. The method includes braiding a wall, having a circumferentially continuous, tubular outer periphery extending along a central axis between opposite open ends, with shrinkable yarns and non-shrinkable yarns. Further, providing the shrinkable yarn having an ability to be shrunken to radially contract the wall from a first, diametrically enlarged assembly state to a second, diametrically constricted state.

In accordance with another aspect of the invention, the method can further include braiding the shrinkable yarns to provide the wall with ratio between the diameter of the first, diametrically enlarged assembly state and diameter of the second, diametrically shrunken state between about 1.5:1 to 5:1 or greater.

In accordance with another aspect of the invention, the method can further include braiding discrete bundles including a plurality of yarns arranged in side-by-side, abutting relation with one another, with the plurality of yarns including the shrinkable yarns and/or the non-shrinkable yarns.

In accordance with another aspect of the invention, the method can further include braiding the yarns that form the discrete bundles from a common bobbin.

In accordance with another aspect of the invention, the method can further include braiding the shrinkable yarns and non-shrinkable yarns separately from one another such that they extend along different paths from one another.

In accordance with another aspect of the invention, the method can further include providing the shrinkable yarns as monofilaments.

In accordance with another aspect of the invention, the method can further include providing the shrinkable yarns as multifilaments.

In accordance with another aspect of the invention, the method can further include providing the shrinkable yarns as multifilaments and/or monofilaments.

In accordance with another aspect of the invention, the method can further include providing the non-shrinkable yarns as monofilaments.

In accordance with another aspect of the invention, the method can further include providing the non-shrinkable yarns as multifilaments.

In accordance with another aspect of the invention, the method can further include providing the non-shrinkable yarns as multifilaments and/or monofilaments.

In accordance with another aspect of the invention, the method can further include providing the non-shrinkable yarns as highly texturized multifilaments.

In accordance with another aspect of the invention, the method can further include providing the non-shrinkable yarns as at least one or more of PET, nylon, PP, PE, PPS, PEEK, and Nomex.

In accordance with another aspect of the invention, the method can further including braiding the wall having a first density when in the first, diametrically enlarged assembly state, such that upon shrinking the wall the wall attains a second density when in the second, diametrically constricted state, with the second density being about 1.5 times greater or more than the first density.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PRESENTLY PREFERRED EMBODIMENTS

Figure 1:
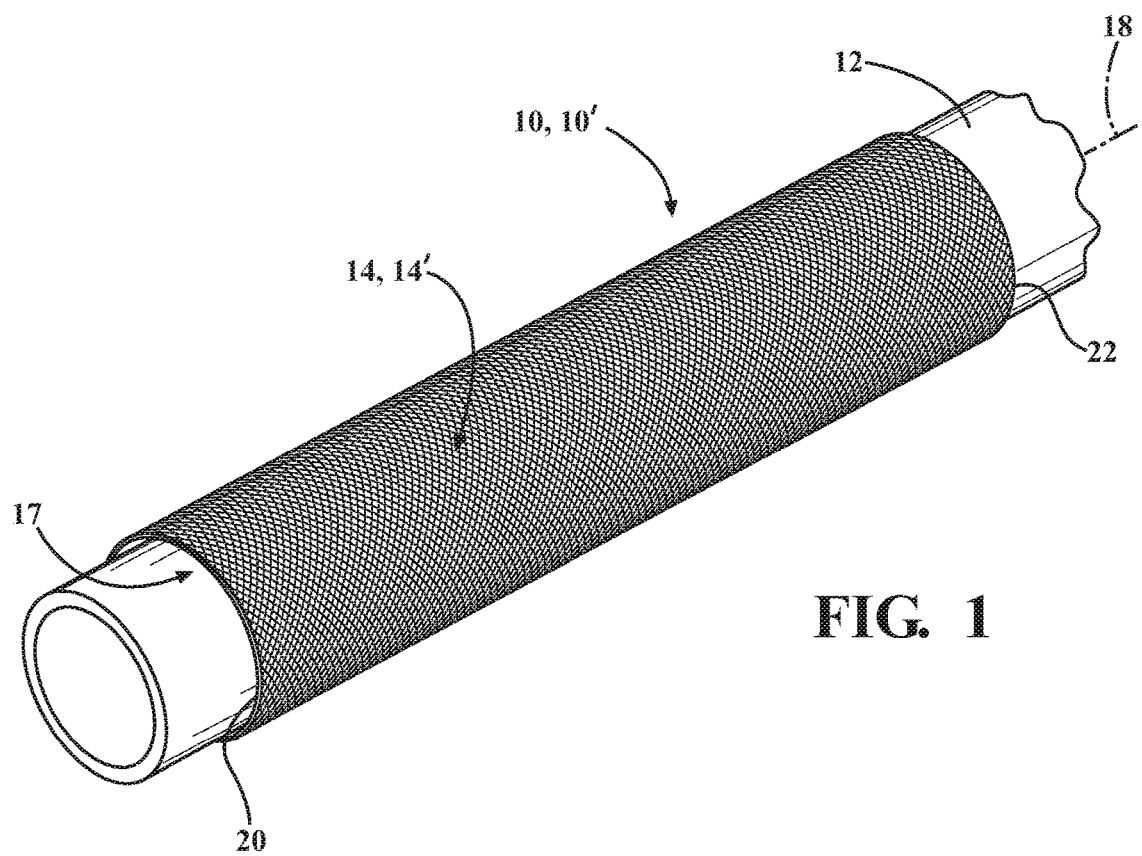
FIG. 1 is a schematic perspective view of a tubular, braided sleeve shown in accordance with one aspect of the disclosure, with the sleeve shown in a shrunken assembled state about an elongate member to be protected.
Figure 1A:
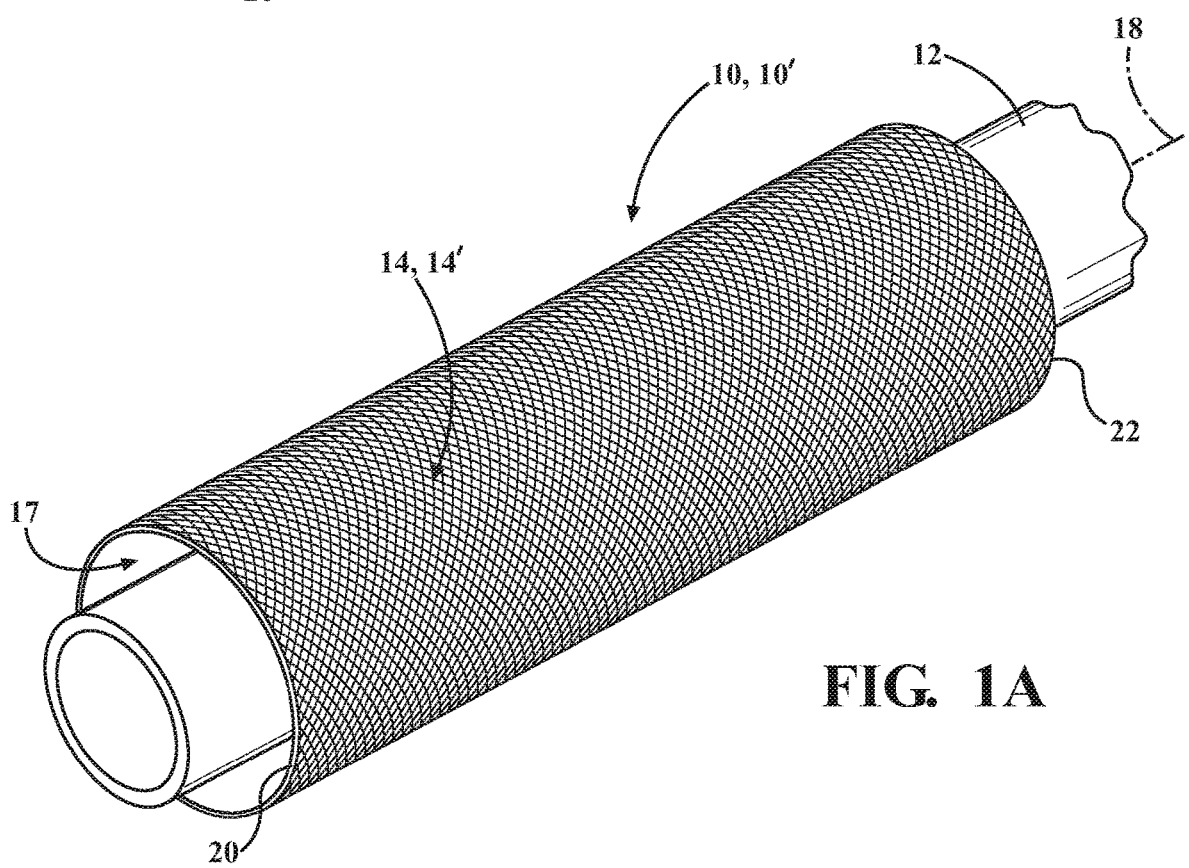
FIG. 1A is a schematic perspective view of the sleeve of FIG. 1 shown in an "as braided", non-shrunken assembly state.

Referring in more detail to the drawings, FIGS. 1 and 1A schematically illustrate a braided protective tubular sleeve, referred to hereafter as sleeve 10, constructed in accordance with one aspect of the disclosure. In FIG. 1, the sleeve 10 is shown disposed about an elongate member 12 to be protected, with the sleeve 10 shown in a second, diametrically shrunken, fully assembled state about the elongate member 12, referred to hereafter as shrunken state or second state. In FIG. 1A, the sleeve 10 is shown in an "as braided", first, diametrically enlarged, non-shrunken assembly state, referred to hereafter as non-shrunken state or first state. The sleeve 10 has an elongate, braided wall 14 having a circumferentially continuous, tubular outer periphery 16 and inner cavity 17 extending along a central longitudinal axis 18 between opposite open ends 20, 22. It is to be understood that by being circumferentially continuous and tubular, that the sleeve 10 does not have lengthwise extending free side edges, but rather is seamless such that the wall cannot be unwrapped or opened along its length. The wall 14 includes at least two different types of yarn, including at least one or a plurality of shrinkable yarns 24 and at least one or a plurality of non-shrinkable, or substantially non-shrinkable yarns 26. It is to be recognized that by substantially non-shrinkable, what is meant is that the yarn 26 may shrink somewhat, such as up to between about 1-10% of its original length, but nowhere near to the extent as the shrinkable yarn 24, which shrinks about 20% or more of its original length. As such, upon braiding the sleeve 10, the wall 14 has both the shrinkable yarn 24 and the non-shrinkable yarn 26 extending in opposite helical directions along the length of the sleeve in braided fashion with one another. Upon finish braiding the sleeve 10, the elongate member 12 is disposed through the cavity 17, such as wires, a wire harness, or conduit, for example, while the sleeve 10 is in the non-shrunken first state. As a result of the wall 14 being non-shrunken, the elongate member 12 is able to be easily fed through the cavity 17 of the sleeve 10. Then, with the sleeve 10 properly positioned along the elongate member 12, the sleeve 10 is heated to a sufficient temperature to cause the shrinkable yarn(s) 24 to shrink without causing damage to the non-shrinkable yarn(s), thereby causing the wall 14 to shrink significantly in diameter into close, snug abutment with an outer surface of the elongate member 12.

With the shrinkable yarn(s) 24 being braided in a non-shrunken state, the sleeve 10 is formed with the wall 14 being enlarged such that the cavity 17 is suitably sized to readily receive the elongate member 12 therethrough. The ratio between the first, "as braided" diameter and the second, as shrunken diameter can range between about 1.5 to 10, or greater. As such, if the elongate member 12 has enlarged fittings, connectors, oddly shaped branches, or the like, it can still be easily inserted through the cavity 17 of the sleeve 10 while in the enlarged, first state. The shrinkable yarn 24 can be provided as either multifilament and/or monofilament, and can be provided having a size ranging between about 50 to 10000 denier. Upon disposing the elongate member 12 through the cavity 17, the wall 14 can be activated to shrink into close fit, snug relation about the elongate member 12 (FIG. 1) via selected application of at least one of heat, fluid, and ultraviolet radiation, depending on the type of shrinkable yarn 24 used. Accordingly, the sleeve 10 becomes fixed or substantially fixed (meaning the sleeve is in static frictional engagement with the elongate member 12, but could possibly be moved relative to the elongate member 12 if a force sufficiently strong is applied thereto along an axial and/or rotational direction, but otherwise the sleeve 10 is maintained in a static location relative to the elongate member 12 as desired) and located about the elongate member 12 without need for secondary fixation mechanisms, thereby doing away for the need for clamps, straps, tape, or the like. Further yet, the braided wall 14 becomes densified upon being shrunken, and thus, the protective attributes of the wall 14, such as impact resistance, abrasion resistance, impermeability, among other things, are greatly increased. For example, the density can increase from a first density in the non-shrunken state to a second density in the shrunken state by about 2 times or greater, and in one sample, the density increased from 249 $kg/m^3$ to 446 $kg/m^3$, by way of example and without limitation. In addition, with the single wall 14 being brought into a close, snug fit about the elongate member 12, the thickness and outer envelop of the wall 14 is minimized, thereby being useful in tight areas. In one sample, the finish thickness of the wall 14 was about 3.6 mm, by way of example and without limitation.

The non-shrinkable or substantially non-shrinkable yarns 26 can be provided as multifilaments and/or monofilaments of at least one or more of PET, nylon, PP, PE, PPS, PEEK, and Nomex material yarns. The denier of the non-shrinkable yarns 26 can range from 50 to 10000. It has been found that relatively bulky multifilaments provide the increased loft to further facilitate dampening impact forces, while also enhancing flexibility of the sleeve 10. The number of yarn ends, including shrinkable and non-shrinkable yarns 24, 26, can be adjusted as desired for the intended application.

Figure 2:
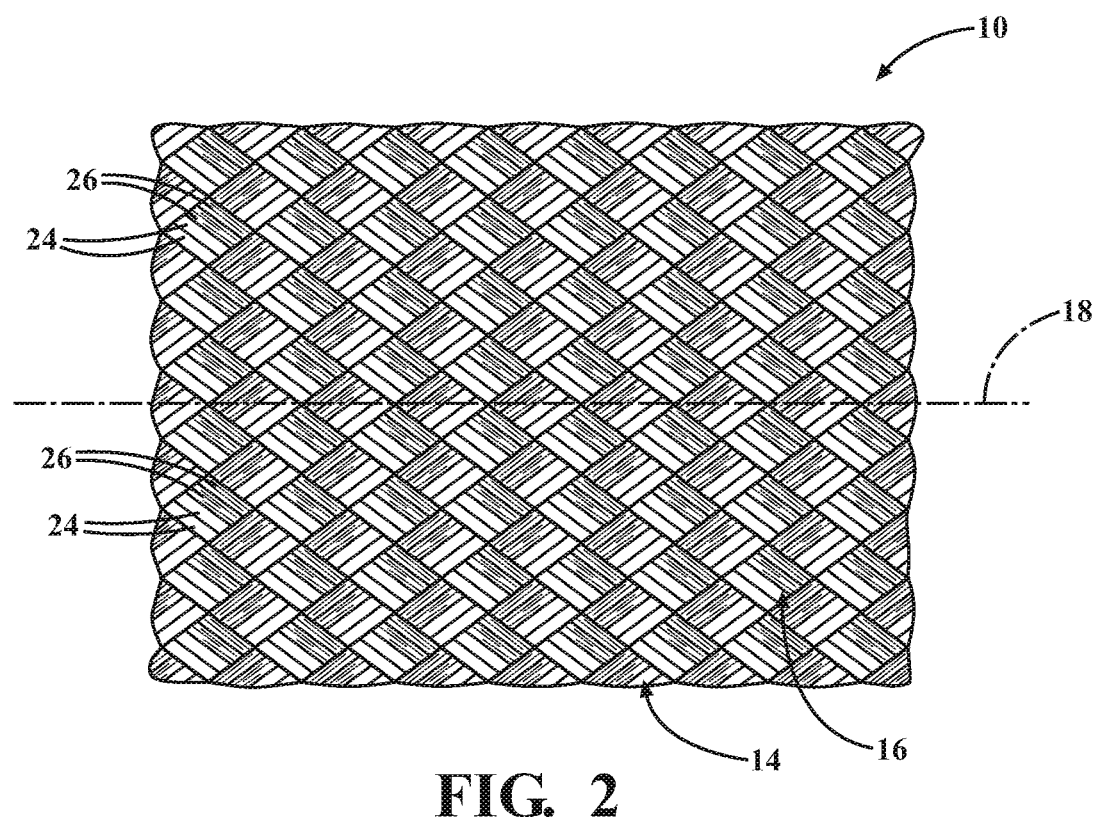
FIG. 2 is a side view of a braided sleeve in accordance with one aspect of the disclosure shown in an "as braided", non-shrunken assembly state.
Figure 5:
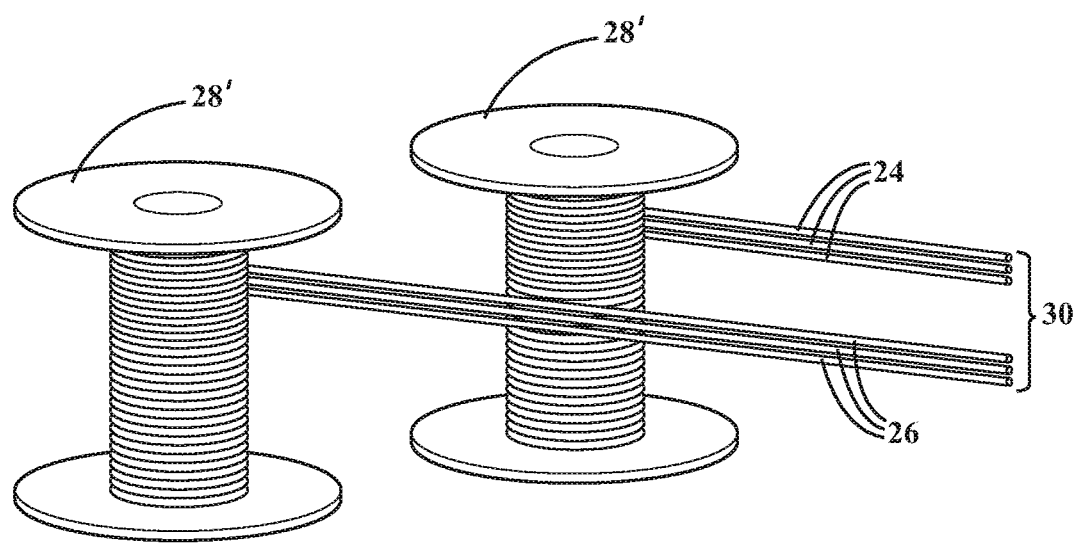
FIG. 5 is a view of a bobbin arrangement in accordance with yet another aspect of the disclosure used to construct the sleeve of FIG. 3.

In accordance with another aspect of the disclosure, the shrinkable and non-shrinkable yarns 24, 26 can be wound about common bobbins 28 as discrete bundles 30 of the shrinkable and non-shrinkable yarns 24, 26, such that the discrete bundles 30 of shrinkable and non-shrinkable yarns 24, 26 can be dispensed from and woven as a single yarn with one another to follow the same braided path with one another (FIGS. 2 and 5). Further, the shrinkable and non-shrinkable yarns 24, 26 can be wound about separate bobbins 28' from one another, and braided separately from one another (FIGS. 3 and 6), such that the shrinkable and non-shrinkable yarns 24, 26 extend along different braided paths from one another.

In a first embodiment illustrated in FIG. 2, shown in a non-shrunken state, the wall 14 of a sleeve 10 was braided with shrinkable and non-shrinkable yarns 24, 26 wound on common bobbins 28 (FIG. 5). On each bobbin 28 of a 48 carrier braider (meaning the braiding machine is set-up to have 48 carrier from which the yarns are braided from the bobbin 28 of the respective carrier), by way of example and without limitation, a pair of the shrinkable yarns 24 and a pair of the non-shrinkable yarns 26 were wound, and thus, each bundle 30 includes 4 yarns in side-by-side, abutting relation, for a total of 196 ends on the 48 carriers. The discrete bundles 30, each containing the aforementioned plurality of yarns, were braided with one another in a 1 over 1 braid pattern, though other braid patterns could be used, such as 2 over 2, 3 over 1, and so on. It is anticipated that the number of ends of shrinkable and non-shrinkable yarns 24, 26 could be other than 2 ends each, such as 1 end of shrinkable yarn 24 with 2 ends of non-shrinkable yarn 26, or any other combination desired for the intended application. In the exemplary embodiment illustrated in FIG. 2, the shrinkable yarn 24 was provided as a 0.38 mm cross-linked polyethylene monofilament and the non-shrinkable yarn 26 was provided as a 2070 denier highly texturized polyester multifilament, by way of example and without limitation. It is to be recognized that any other size and material type of shrinkable and non-shrinkable yarns 24, 26 desired for the intended application can be used. Upon braiding the wall 14, the wall 14 had an unshrunken density of about 249 $kg/m^3$ and about 5 picks-per-inch (PPI), and after shrinking the sleeve 10, the wall had a density of about 446 $kg/m^3$ and a PPI of about 13 PPI with a finished, shrunken inner diameter of about 10 mm, by way of example and without limitation.

Figure 3:
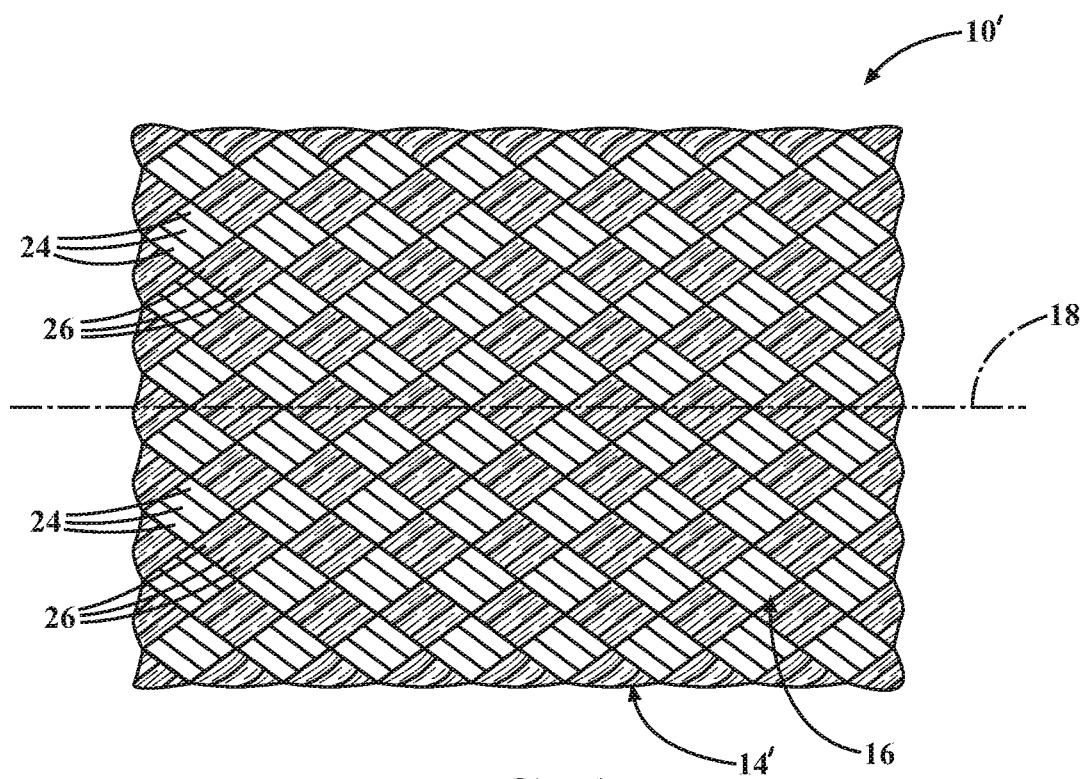
FIG. 3 is a side view of another braided sleeve in accordance with another aspect of the disclosure shown in an "as braided", non-shrunken assembly state.

In another embodiment illustrated in FIG. 3, shown in a non-shrunken state, the wall 14' of a sleeve 10' was braided with shrinkable and non-shrinkable yarns 24, 26 wound on separate bobbins 30 from one another (FIG. 5). On half of the bobbins 28' of a 48 carrier braider, by way of example and without limitation, three shrinkable yarns 24 were wound in side-by-side relation with one another as a discrete bundle, and on the other half of the bobbins 28", by way of example and without limitation, three non-shrinkable yarns 26 were wound in side-by-side relation with one another as a discrete bundle. Accordingly, the resulting braided wall 14' contains a total of 144 ends, with the discrete bundles containing 3 yarns, by way of example and without limitation, each being braided as a single yarn and with one another in the desired braid pattern, as discussed above. It is to be recognized that any number of the shrinkable and non-shrinkable yarns 24, 26 could be wound on the separate bobbins 28', 28", wherein the number of shrinkable and non-shrinkable yarns 24, 26 can be the same or different. Accordingly, the bobbins 28' could have a pair of shrinkable yarns 24 comprising the bundle thereon, while the bobbins 28" could have 1, 3 or more non-shrinkable yarns 26 comprising the bundle thereon, by way of example and without limitation.

Figure 2A:
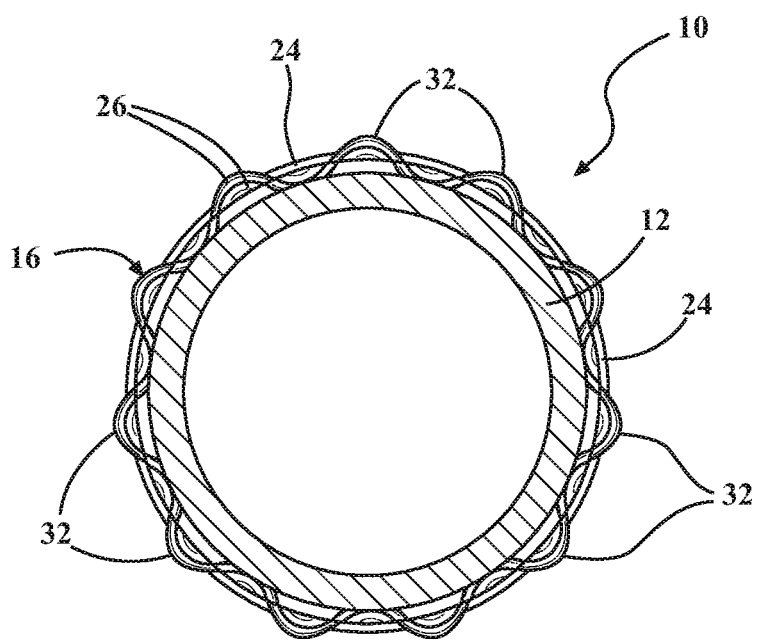
FIG. 2A is a partial end view of the sleeve of FIG. 2 shown in a shrunken assembled state.
Figure 3A:
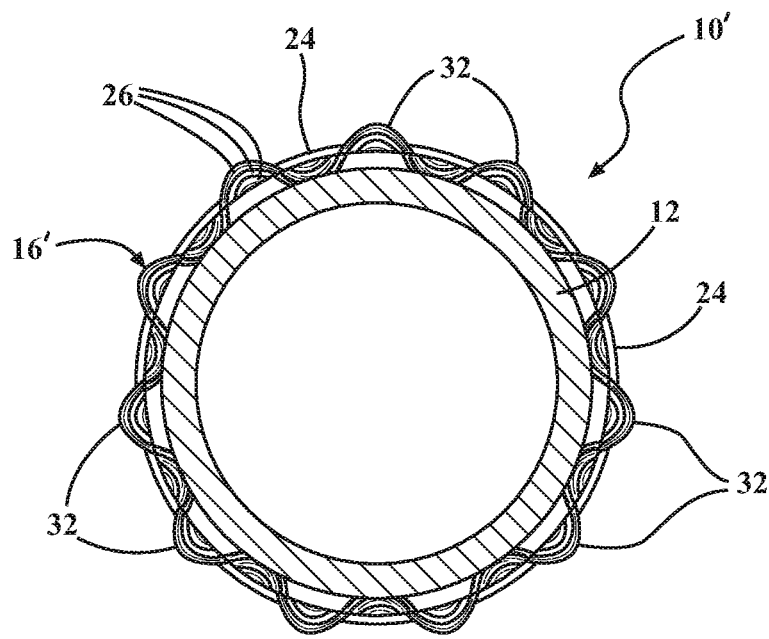
FIG. 3A is a partial end view of the sleeve of FIG. 3 shown in a shrunken assembled state.
Figure 4:
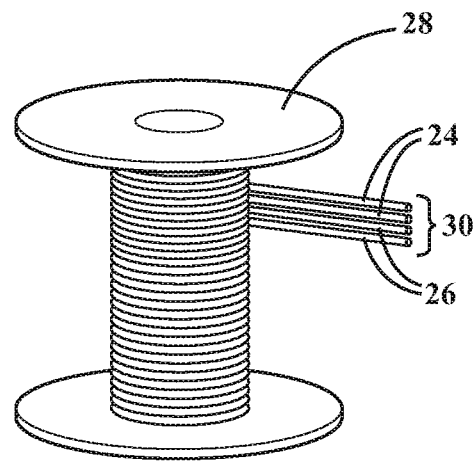
FIG. 4 is a view of a bobbin arrangement in accordance with another aspect of the disclosure used to construct the sleeve of FIG. 2.

In FIGS. 2A and 3A, a portion of the sleeves 10, 10' of FIGS. 2 and 3 are illustrated in a shrunken state, while it is to be recognized that the remain unseen portion of the sleeves 10, 10' is the same. In each embodiment, it can be seen that by having a combination of the shrinkable and non-shrinkable yarns 24, 26, an outer surface 16, 16' of each sleeve 10, 10' is texturized via the shrunken yarns 24 pulling radially inwardly on the non-shrunken yarns 26 upon being shrunken, thereby creating a plurality of lofted pillows 32 of material from each of the non-shrunken yarns at the plurality junctions between the shrinkable and non-shrinkable yarns 24, 26. The lofted pillows 32 protruded radially outwardly in lofted fashion from the radially constricted, shrunken yarns 24, thereby acting to provide relatively soft, discrete, enhanced impact resistance zones 32, which together, act to greatly enhance the impact resistance of the sleeve. It is to be recognized that the pillow zones 32 are immediately adjacent one another as a result of the substantially increased wall density created upon shrinking the wall, and thus, though the zones are discrete and separate, they act together to greatly increase the impact resistance of the sleeve 10, 10'.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A textile sleeve for routing and protecting elongate members, comprising:
    an elongate wall having a circumferentially continuous, tubular outer periphery extending along a central axis between opposite open ends, said wall includes a plurality of yarns braided in helically extending bundles with one another, with each of said bundles including a plurality of said yarns arranged in side-by-side, abutting relation with one another, at least some of said bundles including shrinkable yarn and at least some of said bundles including non-shrinkable yarn, said shrinkable yarn providing the wall with an ability to be radially contracted from a first, diametrically enlarged assembly state to a second, diametrically shrunken state.

2. The textile sleeve of claim 1, wherein at least some of said bundles include at least one of said shrinkable yarns and at least one of said non-shrinkable yarns.

3. The textile sleeve of claim 1, wherein at least some of said bundles only include said shrinkable yarns.

4. The textile sleeve of claim 3, wherein at least some of said bundles only include said non-shrinkable yarns.

5. The textile sleeve of claim 1, wherein at least some of said bundles only include said non-shrinkable yarns.

6. The textile sleeve of claim 1, wherein said shrinkable yarns create radially outwardly extending, lofted pillows of said non-shrinkable yarn upon being shrunken.

7. The textile sleeve of claim 1, wherein the first, diametrically enlarged assembly state has a first diameter and the second, diametrically shrunken state has a second diameter, wherein the ratio of the first and second diameters is between about 1.5:1 to 5:1 or greater.

8. A method of constructing a textile sleeve, comprising:
    braiding a wall having a circumferentially continuous, tubular outer periphery extending along a central axis between opposite open ends with a plurality of yarns, with at least some the yarns including shrinkable yarns and non-shrinkable yarns;
    providing the shrinkable yarn having an ability to be shrunken to radially contract the wall from a first, diametrically enlarged assembly state to a second, diametrically constricted state; and
    further including braiding at least some of said plurality of yarns as discrete helically extending bundles having a plurality of yarns arranged in side-by-side, abutting relation with one another, with at least some of said bundles including said shrinkable yarns and at least some of said bundles including said non-shrinkable yarns.

9. The method of claim 8, further including braiding at least some of said bundles having at least one of said shrinkable yarns and at least one of said non-shrinkable yarns.

10. The method of claim 8, further including braiding at least some of said bundles having only said shrinkable yarns.

11. The method of claim 10, further including braiding at least some of said bundles having only said non-shrinkable yarns.

12. The method of claim 8, further including braiding at least some of said bundles having only said non-shrinkable yarns.

13. The method of claim 8, further including forming radially outwardly extending, lofted pillows of said non-shrinkable yarn by shrinking said shrinkable yarns.

14. The method of claim 8, further including braiding the shrinkable yarns such that the first, diametrically enlarged assembly state has a first diameter and the second, diametrically shrunken state has a second diameter, wherein the ratio of the first and second diameters is between about 1.5:1 to 5:1 or greater.

* * * * *